United States Patent
Schwartpaul et al.

(10) Patent No.: US 12,409,398 B2
(45) Date of Patent: Sep. 9, 2025

(54) SCREEN HAVING VARIABLE CIRCUMFERENCE FOR A THERMOSTATIC VALVE

(71) Applicant: Grohe AG, Hemer (DE)

(72) Inventors: Tanja Schwartpaul, Neuenrade (DE); Ole Benedikt Kostorz, Menden (DE)

(73) Assignee: GROHE AG, Hemer (DE)

( * ) Notice: Subject to any disclaimer, the term of this patent is extended or adjusted under 35 U.S.C. 154(b) by 882 days.

(21) Appl. No.: 17/436,358

(22) PCT Filed: Feb. 28, 2020

(86) PCT No.: PCT/EP2020/055289
§ 371 (c)(1),
(2) Date: Dec. 8, 2021

(87) PCT Pub. No.: WO2020/178174
PCT Pub. Date: Sep. 10, 2020

(65) Prior Publication Data
US 2022/0161161 A1    May 26, 2022

(30) Foreign Application Priority Data
Mar. 5, 2019  (DE) .......................... 102019105518.0

(51) Int. Cl.
*B01D 29/11*  (2006.01)
*C02F 1/00*   (2023.01)
*G05D 23/13*  (2006.01)

(52) U.S. Cl.
CPC ............ *B01D 29/112* (2013.01); *C02F 1/003* (2013.01); *C02F 2307/06* (2013.01); *G05D 23/134* (2013.01)

(58) Field of Classification Search
CPC ....... B01D 29/112; B01D 29/33; C02F 1/003; C02F 2307/06; G05D 23/134
See application file for complete search history.

(56) References Cited

U.S. PATENT DOCUMENTS

| | | | |
|---|---|---|---|
| 2004/0031736 A1 | 2/2004 | Evans | |
| 2005/0011703 A1 | 1/2005 | Yamaguchi | |
| 2006/0021933 A1* | 2/2006 | Radcliffe | ............... B01D 29/96 210/459 |

FOREIGN PATENT DOCUMENTS

| | | |
|---|---|---|
| CN | 109173387 | 1/2019 |
| DE | 42 25 175 | 2/1994 |

(Continued)

OTHER PUBLICATIONS

International Search Report dated Jun. 19, 2020 in International (PCT) Application No. PCT/EP2020/055289, with English language translation.

*Primary Examiner* — Dirk R Bass
(74) *Attorney, Agent, or Firm* — WENDEROTH, LIND & PONACK, L.L.P.

(57) ABSTRACT

The present invention relates to a screen. The screen a) is annular, b) is designed to filter water in a thermostatic valve, c) can be transferred from a first state into an additional state, d) has a first circumference in the first state, and e) has an additional circumference in the additional state. The screen is characterized in that the additional circumference is greater than the first circumference. The invention also relates to a thermostatic valve comprising the screen; to a thermostat fitting comprising the thermostatic valve; to a method comprising connecting the screen to a thermostatic valve body; and to a use of the screen in a thermostatic valve or in a thermostat fitting or in both.

13 Claims, 7 Drawing Sheets

(56) References Cited

FOREIGN PATENT DOCUMENTS

| DE | 195 02 147 | 8/1996 |
|---|---|---|
| EP | 0 808 647 | 11/1997 |
| FR | 2857720 | 1/2005 |
| WO | 2008/025808 | 3/2008 |

* cited by examiner

SCREEN HAVING VARIABLE CIRCUMFERENCE FOR A THERMOSTATIC VALVE

The present invention relates to A strainer screen, wherein the strainer screen
a) is annular in shape,
b) is designed to filter water in a thermostatic valve,
c) can be transferred from a first state to a further state,
d) has a first circumference in the first state, and
e) has a further circumference in the further state,
is characterized in that the further circumference is greater than the first circumference. Further, the invention relates to a thermostatic valve including the strainer screen; a thermostatic faucet including the thermostatic valve; a method, including connecting the strainer screen to a thermostatic valve body; and a usage of the strainer screen in a thermostatic valve or in a thermostatic faucet, or both.

Prior art thermostatic valves, including thermostatic mixing valves, allow for a constant outlet temperature of the mixed water they provide, largely independent of temperature and water pressure fluctuations of the water supply lines. Such thermostatic faucets can be designed, for instance, as faucets for showers, bathtubs or washbasins. Thermostatic valves are used in prior art thermostatic faucets to keep the outlet temperature of the mixed water provided by the faucet constant, if possible at a preset value. For this purpose, the thermostatic valve typically regulates the water flow of the cold water and thus the cold to hot water ratio in the mixed water depending on the water temperature in the faucet. To ensure the longest possible service life of the thermostatic valve and thus of the faucet, suspended matter such as lime particles have to be prevented from entering the thermostatic valve. For this purpose, the thermostatic valve is usually equipped with a strainer. In the prior art, a metal strainer screen is used for this purpose, which is welded to or snapped onto a thermostatic valve body. If the strainer screen is welded on, it is materially bonded to the valve body and can no longer be disassembled without destruction. Thus, the strainer screen cannot be removed for maintenance purposes. However, for a long service life of the valve and accordingly of the faucet, regular cleaning of the strainer screen is required. However, a welded-on strainer screen cannot be disassembled and treated in a descaling solution, for instance. If the strainer screen is merely snapped on, at least one additional O-ring is required in the thermostatic valve assembly to hold the strainer screen in place. That renders production more expensive. Furthermore, if the strainer screen does not fit snug on the valve body, a tolerance gap may occur. If the strainer screen is installed, for instance snapped, in the faucet, the strainer screen can easily be damaged owing to the flared strainer screen caused by the gap. In this case, a defective unit was produced because the strainer screen has to be replaced and a new strainer screen has to be fitted. In addition, the partially flared sharp-edged metal strainer screen can easily cause injuries to the assembling personnel. This is particularly relevant since production usually requires manual labor because of the delicate components. If the strainer screen is not adversely affected or damaged, it is installed in the faucet with the gap. As a result of the tolerance gap, however, the strainer screen does not have a tight fit and suspended particles can enter the valve. Hence, the strainer screen does not ideally fulfill its purpose and the service life of the valve and thus the faucet are limited.

Generally speaking it is the object of this invention to overcome, at least in part, a disadvantage arising from the prior art. A further object of the invention is to provide a thermostatic faucet having a longer service life. This applies in particular when the thermostatic faucet is used with water containing lime. Furthermore, it is the object of the invention to provide a thermostatic faucet that can be serviced as simply and non-destructively as possible. The aforementioned maintenance is, in particular, disassembly and cleaning of a strainer screen of a thermostatic valve of the thermostatic faucet. A further object of the invention is to provide a thermostatic valve that can be produced with fewer rejects. A further object of the invention is to provide a thermostatic valve that can be manufactured with reduced risk of causing injury. A further object of the invention is to provide a thermostatic valve with a simpler design. Furthermore, it is the object of the invention to provide a thermostatic valve that is easier and/or less expensive to manufacture. A further object of the invention is to provide a strainer screen [for] thermostatic valves, wherein the strainer screen is equally suitable for thermostatic valves of different diameters. A further object of the invention is to achieve one of the above advantages, wherein a strainer screen of the thermostatic valve has a consistently good or even improved sealing fit, in particular for great differences in water temperature.

The independent claims contribute to the at least partial solving of at least one of the aforementioned problems. The dependent claims provide preferred embodiments that contribute to at least partially solving at least one of the problems.

A contribution to solving at least one of the problems according to the invention is made by an embodiment 1 of a strainer screen, wherein the strainer screen
a) is annular in shape,
b) is designed to filter water in a thermostatic valve,
c) can be transferred from a first state to a further state,
d) has a first circumference in the first state, and
e) has a further circumference in the further state,
is characterized in that the further circumference is greater than the first circumference. For filtering water in the thermostatic valve, the strainer screen preferably has a plurality of strainer screen openings configured to permit water to pass through but not to permit solids suspended in the water, such as rust or lime particles, to pass through. The transfer can preferably be implemented without tools. For this purpose, the strainer screen may be expanded, preferably by hand. The annular strainer screen preferably has a shape of a thin-walled hollow cylinder. Thin-walled here preferably means that a ratio of inner diameter to outer diameter of the hollow cylinder is at least 0.9.

In an embodiment 2 according to the invention, the strainer screen is configured according to the embodiment 1, wherein in an axial direction the strainer screen
a) has a first length in the first state, and
b) has a further length in the further state,
wherein the first length and the further length differ by less than 5%, preferably less than 4%, more preferably less than 3%, more preferably less than 2%, most preferably less than 1%, of the first length.

In an embodiment 3 according to the invention, the strainer screen is configured according to the embodiment 1 or 2, wherein the strainer screen is integrally formed.

Preferably, the strainer screen does not include fibers and/or wires. Further preferably, the strainer screen does not include woven and/or braided components. The strainer screen can be preferably manufactured by a casting process. A preferred casting process is an injection molding process.

In an embodiment 4 according to the invention, the strainer screen is configured according to any one of the preceding embodiments, wherein the transfer of the strainer screen from the first state to the further state is reversible.

In an embodiment 5 according to the invention, the strainer screen is configured according to any one of the preceding embodiments, wherein the strainer screen moves from the further state to the first state without application of an external force.

In an embodiment 6 according to the invention, the strainer screen is configured according to any one of the preceding embodiments, wherein the further circumference is at least 1%, preferably at least 2%, more preferably at least 3%, more preferably at least 4%, most preferably at least 5%, greater than the first circumference, relative to the first circumference.

In an embodiment 7 according to the invention, the strainer screen is configured according to any one of the preceding embodiments, wherein the strainer screen includes a shell surface of the strainer screen, wherein a spring area of the shell surface of the strainer screen is configured as a spring element. The spring element is preferably elastic in a circumferential direction of the strainer screen. Preferably, the spring element is formed as a radial bulge or deflection, or both, of the shell surface of the strainer screen. This bulge and/or deflection, or both, preferably extend(s) in the axial direction from one end face to an opposite end face of the annular strainer screen. Further, the bulge or deflection, or both, may be directed inwards or outwards, respectively. A preferred shell surface of the strainer screen is a shell surface of a cylinder. The shell surface of the strainer screen preferably includes a plurality of strainer screen openings.

In an embodiment 8 according to the invention, the strainer screen is configured according to any one of the preceding embodiments, wherein the strainer screen includes a shell surface of the strainer screen, wherein the shell surface of the strainer screen is configured to include a plurality of spring elements. Preferably, the spring elements are distributed, preferably equidistantly, along a circumference of the strainer screen. Furthermore, preferably, the spring elements are each elastic in the circumferential direction of the strainer screen. Preferably, the spring elements are each formed as a radial bulge or deflection, or both, of the shell surface of the strainer screen. This bulge or deflection, or both, preferably extend(s) in the axial direction from one end face to an opposite end face of the annular strainer screen. Further, the bulge or deflection, or both, may be directed inwards or outwards, respectively. The plurality of spring elements preferably confers a wave-like shape to the shell surface of the strainer screen, wherein the waves extend in the circumferential direction and crests rise in the radial direction.

In an embodiment 9 according to the invention, the strainer screen is configured according to any one of the preceding embodiments, wherein the strainer screen includes a shell surface of the strainer screen, wherein the shell surface of the strainer screen
  a) includes a plurality of strainer screen openings, and
  b) includes an area that does not include strainer screen openings,
wherein the area extends in the axial direction of the strainer screen from one end face to an opposite end face of the strainer screen. In a preferred embodiment, the strainer screen includes at least one, preferably at least 2, more preferably at least 3, further areas, each of which does not include strainer screen openings and extends in the axial direction of the strainer screen from the end face to the opposite end face of the strainer screen. In another preferred embodiment, the area extends in the axial direction of the strainer screen from the end face to the opposite end face of the strainer screen, and further, the area extends along the entire circumference of the strainer screen. The area preferably has an area greater than at least three times, preferably at least five times, more preferably at least ten times, that of an area of one of the strainer screen openings. Every further area preferably has an area greater than at least three times, preferably at least five times, more preferably at least ten times, that of an area of one of the strainer screen openings.

In an embodiment 10 according to the invention, the strainer screen is configured according to any of the preceding embodiments, wherein the strainer screen comprises a plastic or a metal or both. Preferably, the strainer screen is made of plastic.

A contribution to solving at least one of the problems according to the invention is made by an embodiment 1 of a thermostatic valve, comprising the strainer screen according to any one of its embodiments 1 to 10.

In an embodiment 2 according to the invention, the thermostatic valve is configured of its embodiment 1, wherein the thermostatic valve includes a thermostatic valve body, wherein the strainer screen is connected to the thermostatic valve body through friction locking. Preferably, the strainer screen is not materially bonded to the thermostatic valve body. The thermostatic valve body preferably includes a controller. A preferred controller includes a bi-metal or a capsule filled with an expansion material. A preferred bi-metal is formed like a spring. A preferred expansion material is a paraffin wax.

A contribution to solving at least one of the problems according to the invention is made by an embodiment 1 of a thermostatic valve, comprising the thermostatic valve of its embodiment 1 or 2. The thermostatic faucet is preferably a sanitary thermostatic faucet. A preferred sanitary thermostatic faucet is one selected from a shower faucet, a bath faucet, and a wash basin faucet, or a combination of at least two of the above.

A contribution to solving at least one of the problems according to the invention is made by an embodiment 1 of a process, comprising the process stages listed below
  a) providing the strainer screen according to any one of its embodiments 1 to 10, wherein the strainer screen is in the first state;
  b) transferring the strainer screen from the first state to the further state; and
  c) connecting the strainer screen to a thermostatic valve body.

The connection is preferably a friction-type connection. Preferably, the connection does not involve a material bond.

A contribution to solving at least one of the problems according to the invention is made by an embodiment 1 of a usage according to any one of its embodiments 1 to 10 in a thermostatic valve or in a thermostatic faucet, or in both.

Preferred components and parts of an embodiment according to the invention in one category of the invention are also preferred in further embodiments of the other categories of the invention for equivalent components and parts or those having the same names. Likewise, preferred features of an embodiment according to the invention in one category of the invention are also correspondingly preferred in further embodiments of the other categories of the invention. The invention is illustrated in more detail below based on examples and drawings, wherein the examples and drawings do not imply any limitation of the invention. Drawings are not to scale unless otherwise indicated.

Figure 3:
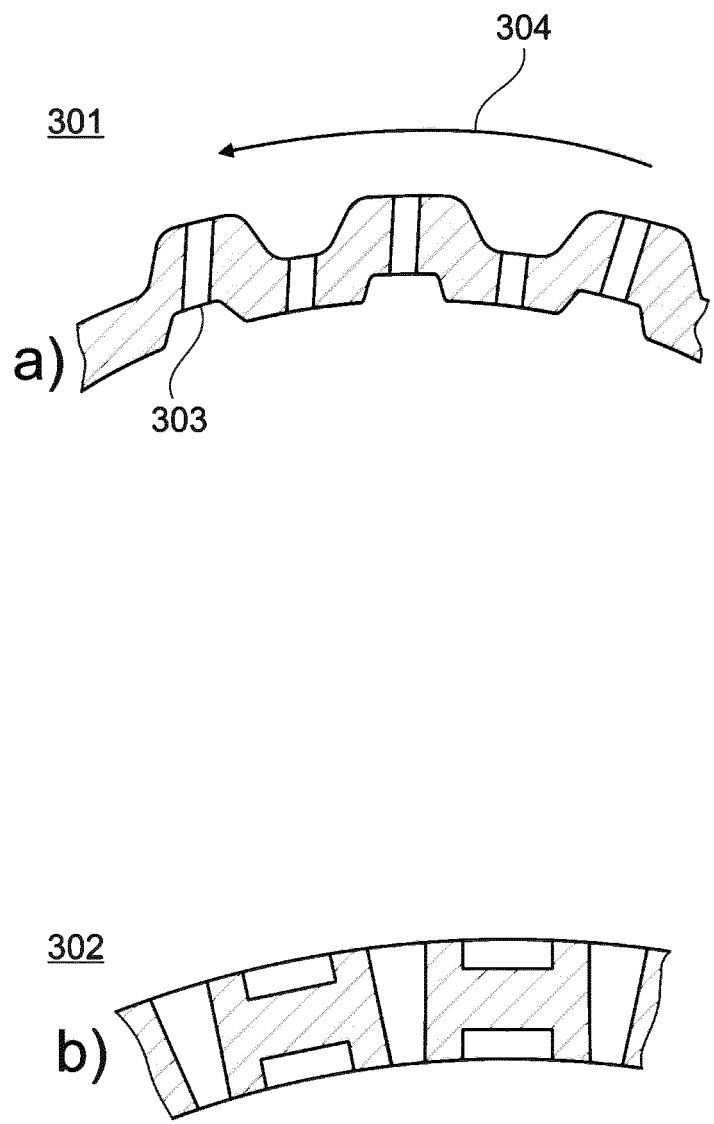
Figure 4:
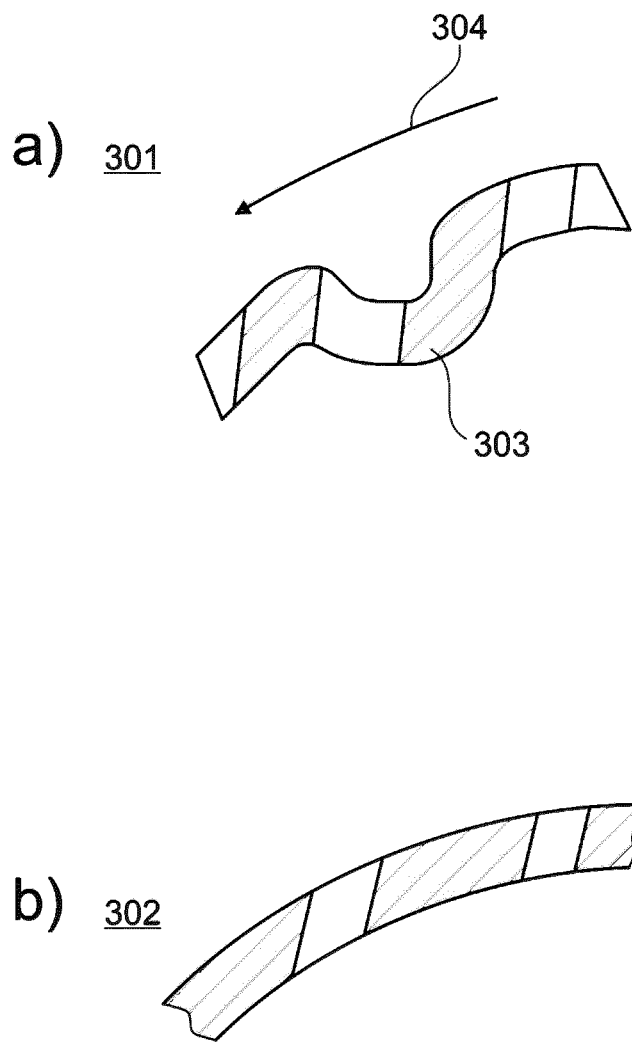
Figure 5:
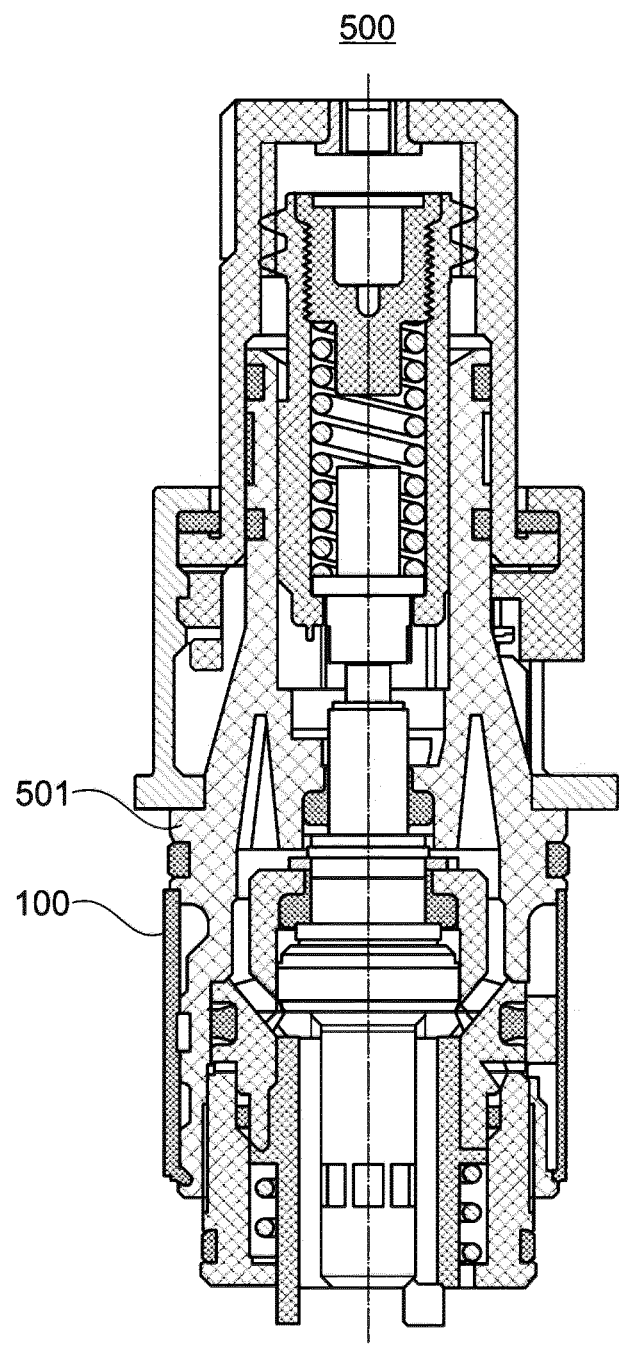
Figure 6:
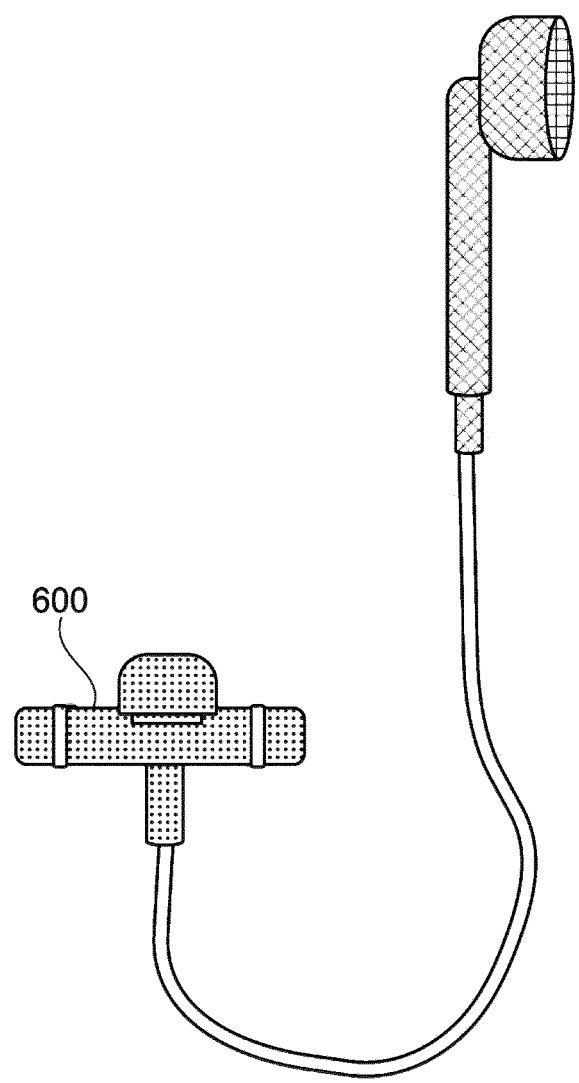
Figure 7:
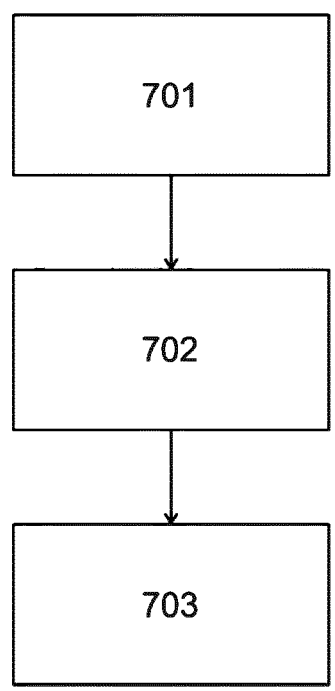

FIG. 3a) shows a schematic representation of a first state of a section of a shell surface of the strainer screen of a strainer screen according to the invention;

FIG. 3b) shows a schematic representation of a further state of the section of the shell surface of the strainer screen of the strainer screen according to the invention of FIG. 3a);

FIG. 4a) shows a schematic representation of a first state of a section of a shell surface of the strainer screen of a strainer screen according to the invention;

FIG. 4b) shows a schematic representation of a further state of the section of the shell surface of the strainer screen of the strainer screen according to the invention of FIG. 4a);

FIG. 5 shows a schematic cross-sectional view of a thermostatic valve according to the invention;

FIG. 6 shows a schematic representation of a thermostatic valve according to the invention; and FIG. 7 shows a flow chart of a process according to the invention.

Figure 1:
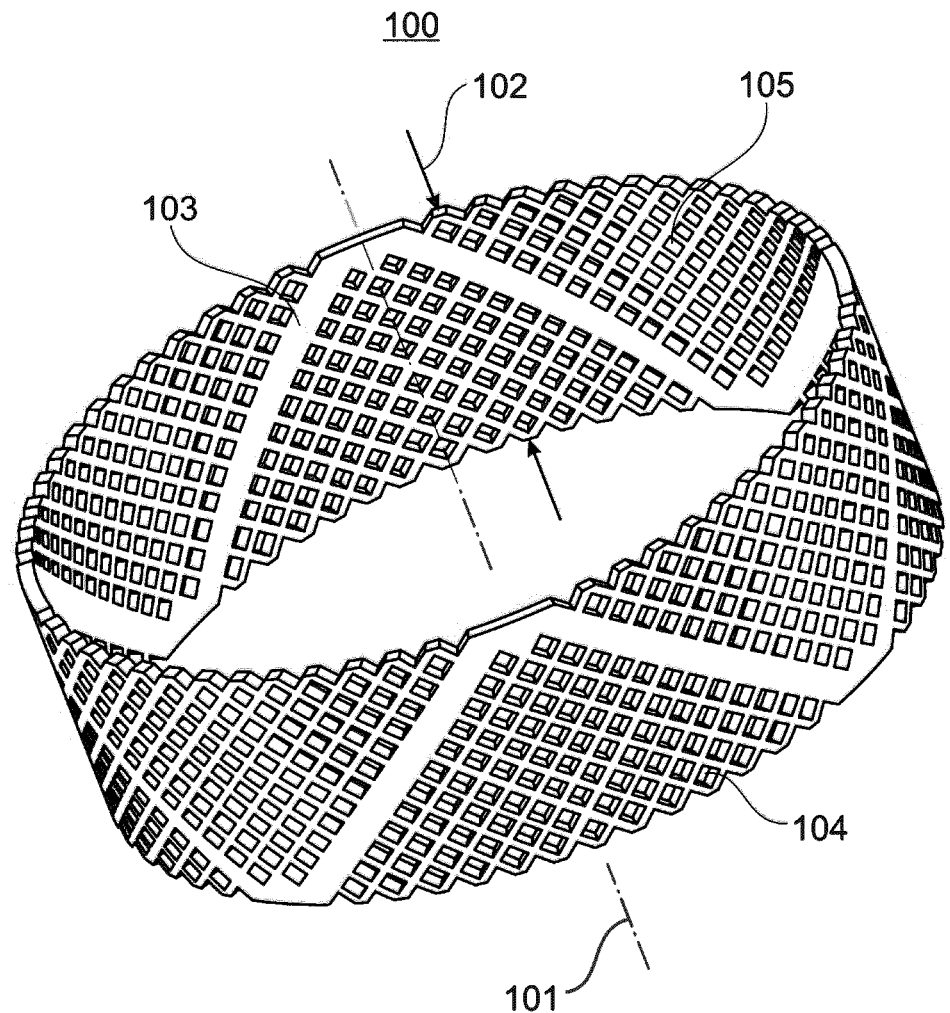
FIG. 1 shows a schematic representation of a strainer screen according to the invention.

FIG. 1 shows a schematic representation of a strainer screen 100 according to the invention. The strainer screen 100 is annular in shape. In this case, the strainer screen 100 also has the shape of a thin-walled hollow cylinder. Further, the strainer screen 100 is configured to filter water in a thermostatic valve 500. To this end, the strainer screen 100 has a plurality of strainer screen openings 104 in its shell surface of the strainer screen 105. To install and remove the strainer screen 100 from the thermostatic valve 500, the strainer screen 100 can be transferred from a first state 301 to a further state 302 and vice versa. The transfer is therefore reversible. In addition, the transfer can be performed by means of a tool-less expansion of the strainer screen 100 by hand. In the first state 301, the strainer screen 100 has a first circumference and in the further state 302, the strainer screen 100 has a further circumference. There, the further circumference is 6% greater than the first circumference, relative to the first circumference. During the expansion, one length 102 of the strainer screen 100 does not change in an axial direction 101. The strainer screen 100 is made of plastic and can be integrally manufactured using an injection molding process. For this purpose, the strainer screen includes an area 103 that does not have any strainer screen openings 104. This area 103 extends in the axial direction 101 of the strainer screen 100 from one end face to an opposite end face of the strainer screen 100, and further, the area 103 extends along the entire circumference of the strainer screen 100. Detailed representations of the shell surface of the strainer screen 105 of the strainer screen 100 are shown in FIGS. 3a) and 3b).

Figure 2:
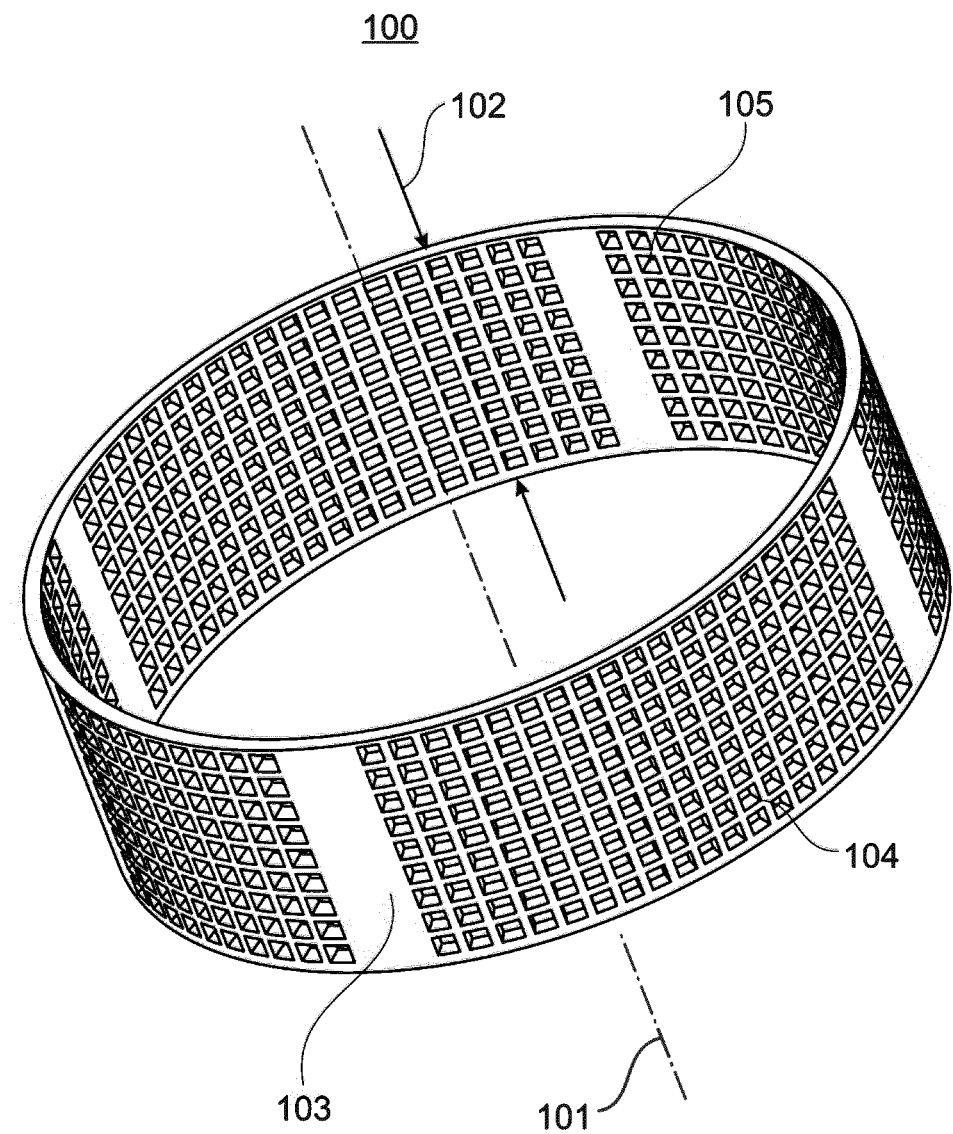
FIG. 2 shows a schematic representation of a further strainer screen according to the invention.

FIG. 2 shows a schematic representation of a further strainer screen according to the invention.

For the strainer screen 100 of FIG. 2 the above description of this strainer screen 100 of FIG. 1 is also valid. Deviating therefrom, here the further circumference is 3% greater than the first circumference, relative to the first circumference. Further, the strainer screen 100 of FIG. 2 includes 4 areas 103, each of which does not include a strainer screen opening 104. These areas 103 each extend from one end face to an opposite end face of the strainer screen 100 in the axial direction 101 of the strainer screen 100. In addition, the areas 103 are distributed equidistantly along the circumference of the strainer screen 100. Detailed representations of the shell surface of the strainer screen 105 of the strainer screen 100 of FIG. 2 are shown in FIGS. 4a) and 4b).

FIG. 3a) shows a schematic representation of a section of the shell surface of the strainer screen 105 of the strainer screen 100 of FIG. 1 according to the invention in the first state 301. It can be seen that the shell surface of the strainer screen 105 is formed to include a plurality of spring elements 303. The spring elements 303 are equidistantly distributed along the circumference of the strainer screen 100. Further, the spring elements 303 are each elastic in a circumferential direction 304 of the strainer screen 100. Here, the spring elements 303 are each formed as radial outward bulges 303 of the shell surface of the strainer screen 105. In that case, the bulges 303 each extend in the axial direction 101 from one end face to an opposite end face of the annular strainer screen 100.

FIG. 3b) shows a schematic representation of the section of the shell surface of the strainer screen 105 of the strainer screen 100 of the invention of FIG. 3a) in the further state 302. In this instance it is apparent that the bulges 303 are smoothed in the circumferential direction 304 by the expanding strainer screen 100.

FIG. 4a) shows a schematic representation of a section of a shell surface of the strainer screen 105 of a further strainer screen 100 according to the invention in a first state 301.

It can be seen that the shell surface of the strainer screen 105 includes a spring area having a spring element 303. The spring element 303 is elastic in a circumferential direction 304 of the strainer screen 100. Here, the spring element 303 is formed as a radial outwards deflection 303 of the shell surface of the strainer screen 105. In this case, the bulge 303 extends in the axial direction 101 from one end face to an opposite end face of the annular strainer screen 100.

FIG. 4b) shows a schematic representation of the section of the shell surface of the strainer screen 105 of the strainer screen 100 of the invention of FIG. 4a) in the further state 302. Here, it can be seen that the deflection 303 is smoothed in the circumferential direction 304 by the expanding strainer screen 100.

FIG. 5 shows a schematic cross-sectional view of a thermostatic valve 500 according to the invention. The thermostatic valve 500 is designed to be built into the thermostatic faucet 600 of FIG. 6. Further, the thermostatic valve 500 includes the strainer screen of FIG. 1. Here, the strainer screen 100 is connected to a thermostatic valve body 501 through frictional attachment. To this end, the strainer screen 100 has a circumference that is between the first circumference and the further circumference.

FIG. 6 shows a schematic representation of a thermostatic faucet 600 according to the invention.

The thermostatic faucet 600 is a shower faucet, including the thermostatic valve 500 of FIG. 5.

FIG. 7 shows a flow chart of a process 700 according to the invention. In a process stage a) 701 of the process 700, the strainer screen 100 of FIG. 2 is provided, wherein the strainer screen 100 is in the first state 301 shown in FIG. 4a). In a process stage b) 702, the strainer screen 100 is expanded by hand and thus transferred from the first state 301 to the further state 302 (see FIG. 4b)). In a subsequent method step c) 703, the strainer screen 100 is frictionally connected to a thermostatic valve body 501, wherein the strainer screen 100 assumes a state in which the strainer screen 100 has a circumference between the first circumference and the further circumference. In this way, a thermostatic valve 500 with the strainer screen 100 is obtained.

LIST OF REFERENCE NUMERALS 100 strainer screen according to the invention
101 axial direction
102 length
103 area
104 strainer screen opening
105 shell surface of the strainer screen
301 first state
302 further state
303 spring element/bulge/deflection
304 circumferential direction
500 thermostatic valve according to the invention
501 thermostatic valve body
600 thermostatic faucet according to the invention
700 process according to the invention
701 process stage a)
702 process stage b)
703 process stage c)

The invention claimed is:

1. A strainer screen (100), comprising:
- an annular shape having an axial direction (101) and a radial direction perpendicular to the axial direction (101),
- a shell surface (105) comprising a plurality of spring elements, wherein each spring element is a radial bulge, a deflection or both and is directed inwards or outwards in the radial direction,
- a first circumference in a first state (301),
- a further circumference in a further state (302), the further circumference being greater than the first circumference, and wherein the strainer screen (100) is transferable from the first state (301) to the further state (302),
- a plurality of strainer screen openings (104),
- an area with no strainer screen openings (103) extending in the axial direction from one end face of the strainer screen (100) to an opposite end face of the strainer screen (100) and extending along an entire circumference of the strainer screen (100), and
- wherein the strainer screen (100) is designed to filter water in a thermostatic valve (500).

2. The strainer screen (100) according to claim 1, further comprising:
- in the axial direction (101), a first length in the first state (301), and
- in the axial direction (101), a further length in the further state (302),
- wherein the first length and the further length differ by less than 5% of the first length.

3. The strainer screen (100) according to claim 1, wherein the strainer screen (100) is integrally formed.

4. The strainer screen (100) according to claim 1, wherein the further circumference is at least 1% greater than the first circumference, relative to the first circumference.

5. The strainer screen (100) according to claim 1, wherein the plurality of spring elements is distributed equidistantly along a circumference of the strainer screen (100) with respect to a center point of the strainer screen (100).

6. The strainer screen (100) according to claim 1, wherein the plurality of spring elements extends from the one end face of the strainer screen (100) to the opposite end face of the strainer screen (100).

7. The strainer screen (100) according to claim 1, wherein the plurality of spring elements confers a wave shape to the shell surface (105) in which waves extend in a circumferential direction (304) and crests rise in the radial direction of the strainer screen (100).

8. The strainer screen (100) according to claim 1, wherein the plurality of spring elements are elastic in a circumferential direction (304) of the strainer screen (100).

9. The strainer screen (100) according to claim 1, when the strainer screen (100) is transferred from the first state (301) to the further state (302), the plurality of spring elements is smooth in a circumferential direction (304) of the strainer screen (100).

10. A thermostatic valve (500) comprising the strainer screen (100) according to claim 1.

11. The thermostatic valve (500) according to claim 10, wherein the thermostatic valve (500) comprises a thermostatic valve body (501), and the strainer screen (100) is frictionally connected to the thermostatic valve body (501).

12. A thermostatic faucet (600), comprising the thermostatic valve (500) according to claim 7.

13. A method of connecting a strainer screen to a thermostatic valve body, comprising the steps of
a) providing the strainer screen (100) according to claim 1, wherein the strainer screen (100) is in the first state (301);
b) transferring the strainer screen (100) from the first state (301) to the further state (302); and
c) connecting the strainer screen (100) to a thermostatic valve body (501).

* * * * *